G. AMBORN.
TOOL HOLDER.
APPLICATION FILED JAN. 6, 1913.
1,158,100.
Patented Oct. 26, 1915.
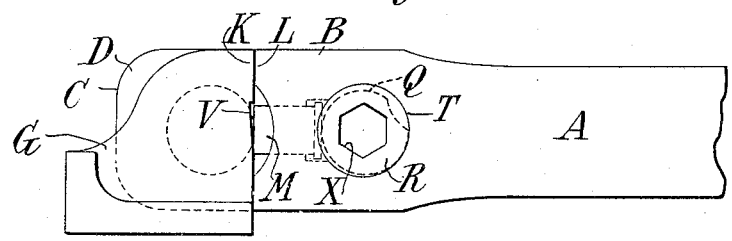
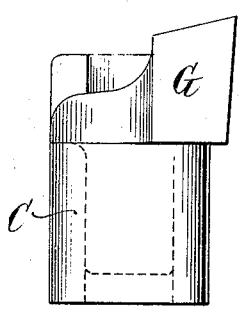
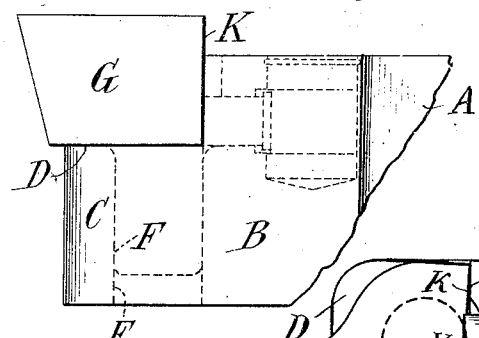
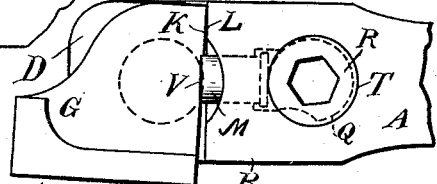
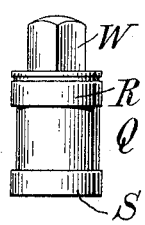
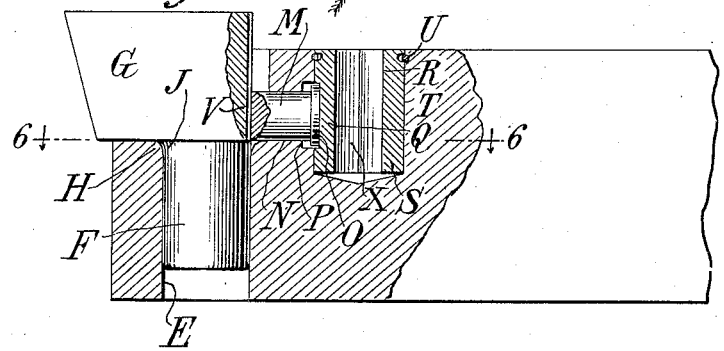
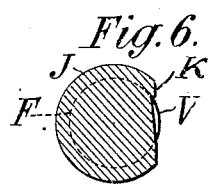
WITNESSES:
René Bruine
Fred White
INVENTOR:
George Amborn,
By Attorneys,

UNITED STATES PATENT OFFICE.

GEORGE AMBORN, OF CHAPINVILLE, CONNECTICUT, ASSIGNOR TO J. H. WILLIAMS & CO., OF BROOKLYN, NEW YORK, A CORPORATION OF NEW YORK.

TOOL-HOLDER.

1,158,100.  Specification of Letters Patent.  Patented Oct. 26, 1915.

Application filed January 6, 1913. Serial No. 740,317.

*To all whom it may concern:*

Be it known that I, GEORGE AMBORN, a citizen of the United States, residing at Chapinville, in the county of Litchfield and State of Connecticut, have invented certain new and useful Improvements in Tool-Holders, of which the following is a specification.

This invention aims to provide an improved tool holder for holding the cutter or tool of a lathe, whereby the tool is clamped in the best position to take the strain, and is clamped firmly and conveniently and can be easily and quickly removed.

The accompanying drawings illustrate an embodiment of the invention.

Figure 1 is a plan view of the holder with the tool therein before clamping; Fig. 1ª is a similar view after clamping; Fig. 2 is a side elevation of Fig. 1; Fig. 3 an end elevation of the same; Fig. 4 a vertical longitudinal section of the same before clamping Fig. 5 is a detail of a slightly modified style of cam member for clamping the tool in place; and Fig. 6 is a section of the tool on the line 6—6 of Fig. 4.

Referring now to the embodiment of the invention illustrated, the tool A has a head B slightly enlarged in width, and the lower portion of which projects beyond the upper portion so as to provide a projecting portion C with a flat face D upon which the head of the tool may rest. The projecting portion C of the holder is formed with a vertical bore E extending entirely through it so as to receive the stem F of the tool, while the head G of the latter rests upon the top of the extension C. The hole E is reamed out on its upper end to form the flare H, and the upper end of the stem of the tool is provided with a fillet J extending part way around as shown in Fig. 6. The part J is cut away on its inner side face. The tool head has a vertical inner side face K which bears against a vertical transverse face L at the outer end of the upper part of the holder.

The tool, in the position illustrated, with its stem F extending into the hole E of the holder, is clamped by means of a clamping device which engages its inner face K. As illustrated, this clamping device comprises a short pin M extending longitudinally through a suitable opening N in the upper part of the holder, the pin having a head O fitting loosely in the enlarged portion P of the opening N, the head O of the pin being engaged by a cam Q which constitutes the intermediate part of the cam member, the end portions R and S of which constitute bearings fitting with a good bearing fit in a vertical opening T of the holder. After inserting the pin in place through the hole T and then inserting the cam member, the latter is fastened by means of a wire ring U partly entering a groove in the cam member, and a surrounding groove in the body of the holder. The pin M is thus retained by the cam even when the tool is withdrawn, and cannot drop out of the holder or be withdrawn except after first withdrawing the cam.

The horizontal strain upon the tool is in the direction of the arrow shown in Fig. 1ª, and this strain is resisted by the bearing of the vertical face K of the tool against the corresponding face L of the holder. The inner vertical bearing face K of the tool is slightly cut away as indicated at V so as to provide a face for engagement by the end of the clamping pin M; the face V being slightly inclined and in such a direction as to tend to rotate the tool about its stem F in the same direction in which the tool would be rotated by the working strain. Without this slightly inclined face V the clamping pin M would tend to press the center of the vertical bearing face K of the tool away from the corresponding face of the holder, so that the tool would rock slightly in a horizontal plane about the end of the clamping pin. By providing the slightly inclined face V the pressure of the clamping pin tends to swing the tool about a vertical axis so as to bring the rear portion of the face K of the tool to bear strongly against the corresponding portion of the face L of the holder; and the tool is thus held with a rigid bearing at two points, the end of the pin M and the rear portion of the face L, and bears squarely on the end of the pin, as shown in Fig. 1ª.

The tool must be easily set into the holder and withdrawn therefrom, and must therefore fit the holder loosely. This being the fact the pushing forward of the pin M against the face V of the tool will push the tool away from the holder so as to separate the faces K and L and will turn the tool on its vertical axis until further turning is prevented by the bearing of the rear portion of the face K against the face L; the parts being so designed and proportioned that this contact of the rear portions of the faces K and L will take place simultaneously with the coming of the pin M to a flat bearing against the face V, as shown in Fig. 1, or slightly before such a flat bearing at V.

The holder thus described will take either a right-handed or a left-handed cutter, or straight special cutters of various sorts.

The cam member may be operated by means of a projecting polygonal head W (Fig. 5). Preferably however the member is made hollow as shown in Fig. 4, and is provided with a hexagonal or other polygonal opening into which a suitably shaped clamping tool can be inserted to turn the cam and grip the cutting tool. This opening X preferably extends through the cam member from end to end so that the tool by which this member is turned can secure a long bearing therein. The opening X is slightly flared at the ends so that the tool which fits therein will come to a bearing most firmly at points between the ends and between the end portions R and S which constitute the rotary bearings of the cam member. This avoids any eccentric strain upon these rotary bearings, and insures the greatest durability for the entire construction.

No claim is made herein on the design and mounting of the cam member, except in combination with other features, the design and mounting of the cam member being claimed in a separate application (Serial Number 740,102, filed January 4, 1913).

I claim as my invention:—

1. A tool holder having a transverse opening adapted to receive the shank of a tool and a longitudinal opening with an enlargement at its rear end, a longitudinally movable pin in said opening having an enlarged head fitting loosely in said enlargement, said holder having a rear opening, communicating with said longitudinal opening and of sufficient size to permit the passage of said pin into its place, and means in said rear opening serving to retain said pin in place and to force said pin against such a tool to clamp the latter in place.

2. A tool holder having a pin adapted to be forced against a tool to clamp the latter in place and having an opening to receive said pin, said opening having an enlargement at its rear end and said pin having an enlarged head fitting loosely in said enlargement, said holder having a second opening communicating with the rear end of the first-mentioned opening and large enough to permit the passage of said pin into its place, and means in said second opening for retaining said pin in its place.

3. A tool holder having a pin adapted to be forced against a tool to clamp the latter in place and having an opening to receive said pin, said pin having an enlargement adapted to prevent its passage forward through said opening, said holder having a second opening communicating with the rear end of the first-mentioned opening and large enough to permit the passage of said pin into its place, and a rotary cam in said second opening bearing against the rear end of said pin to retain it in place and to force it against the tool.

4. A tool holder having a transverse opening adapted to receive the shank of a tool, a longitudinal opening for receiving a clamping pin and a vertical opening adapted to receive a cam rotatable about a vertical axis, said vertical opening communicating with said longitudinal opening and being of sufficient size to permit the passage of such a clamping pin through said vertical opening and into said longitudinal opening, a clamping pin adapted to enter said longitudinal opening and having an enlarged head to prevent its passage forward through said longitudinal opening, and a cam adapted to enter said vertical opening and bear against the head of said pin to hold said pin in place and to force the same against the tool.

5. A tool holder having a projecting portion formed with a shank-receiving vertical opening adapted to receive the shank of a tool and with a face adapted to support the head of such tool, said holder having a longitudinal opening, a clamping pin in said longitudinal opening adapted to engage with its outer end a side face of the head of such tool when the shank of the tool is in said vertical opening so as to clamp such tool in place, said clamping pin being held against forward passage through its longitudinal opening when the tool is removed, said holder having a cam-receiving transverse opening in the rear of said pin, and a rotatable cam in said cam-receiving transverse opening bearing against the rear end of said pin and adapted by its rotation to force the pin against the tool.

6. A tool holder having a projecting portion with a flat face upon which the head of a tool may rest and with a vertical bore to receive a stem of such tool, and having a vertical transverse face adjacent to the head of such tool, said tool holder having a second vertical opening back from said transverse face and having a longitudinal opening extending from said transverse face to said second vertical opening, said second vertical opening being cylindrical, a cam journaled therein to rotate about a vertical axis and fixed against longitudinal movement, and a clamping pin in said longitudinal opening bearing at its rear end against said cam and adapted to bear at its outer end against the inner side face of the head of such tool to clamp it in place, and means for preventing the forward passage of said pin through its opening when the tool is removed while permitting a sufficient advance of the pin to avoid interference with the insertion and withdrawal of the cam into and out of its opening.

7. A tool holder having a vertical opening adapted to receive the shank of a tool and having a face which receives the backward pressure of the tool in combination with a tool having a face adapted to bear against said face of the holder and a movable member adapted to bear against a portion of said face of the tool to clamp the latter in place, the engaging portions of said face of the tool and of said movable member being so shaped that the pressure of said member tends to turn the rear of the face of the tool hard against said face of the holder.

8. A tool holder having a vertical opening adapted to receive the shank of a tool, and having a face L which receives the backward pressure of the tool in combination with a tool having a face K adapted to bear against said face L of the holder, and a movable member adapted to bear against a portion of said face K of the tool to clamp the latter in place, the portion of said face K which is engaged by said member being slightly inclined as at V, so that the pressure of said member tends to turn the rear of the face K hard against the face L of the holder.

In witness whereof, I have hereunto signed my name in the presence of two subscribing witnesses.

GEORGE AMBORN.

Witnesses:
CHARLES B. HARRIS,
WILLIAM G. COLE.